(12) United States Patent
Zhou

(10) Patent No.: US 9,588,279 B2
(45) Date of Patent: Mar. 7, 2017

(54) LIGHT GUIDE PLATE, BACKLIGHT MODULE, AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 237 days.

(21) Appl. No.: 14/412,686

(22) PCT Filed: Dec. 9, 2014

(86) PCT No.: PCT/CN2014/093337
§ 371 (c)(1),
(2) Date: Jan. 4, 2015

(87) PCT Pub. No.: WO2016/082249
PCT Pub. Date: Jun. 2, 2016

(65) Prior Publication Data
US 2016/0356945 A1     Dec. 8, 2016

(30) Foreign Application Priority Data

Nov. 26, 2014   (CN) .......................... 2014 1 0696953

(51) Int. Cl.
*F21V 8/00*      (2006.01)
(52) U.S. Cl.
CPC ......... *G02B 6/0055* (2013.01); *G02B 6/0058* (2013.01)

(58) Field of Classification Search
CPC ........................... G02B 6/0055; G02B 6/0058
See application file for complete search history.

(56) References Cited

U.S. PATENT DOCUMENTS

| | | | |
|---|---|---|---|
| 7,431,490 B2* | 10/2008 | Yu ........................ | G02B 6/0036 362/331 |
| 8,333,497 B2* | 12/2012 | Weng ................... | G02B 6/0036 362/607 |
| 8,348,489 B2* | 1/2013 | Holman ................... | F21K 9/61 313/508 |
| 2003/0174491 A1* | 9/2003 | Ohizumi .............. | G02B 6/0018 362/610 |

(Continued)

*Primary Examiner* — Mary Allen Bowman
(74) *Attorney, Agent, or Firm* — Andrew C. Cheng

(57) ABSTRACT

A light guide plate includes a light exit surface, a reflection surface opposite to the light exit surface, at least one light incidence surface connecting to the light exit surface and the reflection surface, and two side surfaces. The reflection surface includes first and second minute projection structures projecting toward interior of the light guide plate, the second minute projection structures being arranged between the first minute projection structures and the two side surfaces of the light guide plate. The first minute projection structures each include at least two side faces coated with a high reflectivity material and forming at least one included angle pointing toward the at least one light incidence surface. The second minute projection structures each include a side face coated with a high reflectivity material and defining two angles, which are less than 90°, with respect to a light incidence surface and a side surface.

20 Claims, 3 Drawing Sheets

(56) References Cited

U.S. PATENT DOCUMENTS

2006/0002675 A1* 1/2006 Choi .................... G02B 6/0038
385/129
2014/0104885 A1* 4/2014 Zhang .................. G02B 6/0036
362/626

* cited by examiner

LIGHT GUIDE PLATE, BACKLIGHT MODULE, AND DISPLAY DEVICE

CROSS REFERENCE TO RELATED APPLICATIONS

This application claims the priority of Chinese Patent Application No. 201410696953.6, entitled "Light Guide Plate, Backlight Module, and Display Device", filed on Nov. 26, 2014, the disclosure of which is incorporated herein by reference in its entirety.

BACKGROUND OF THE INVENTION

1. Field of the Invention

The present invention relates to the field of displaying technology, and in particular to a light guide plate, a backlight module, and a display device.

2. The Related Arts

In the field of displaying technology, the most commonly seen display devices are liquid crystal displays (LCDs). Liquid crystal polymer used in the liquid crystal displays does not have the property of luminosity and can achieve an effect of displaying relying upon light emitting from a backlight module. Generally, a backlight module comprises a light guide plate and multiple light sources. Light emitting from the multiple light sources, after being subjected to reflection and scattering by microstructures formed on the light guide plate, is given off in a uniform manner from a light exit surface of the light guide plate.

Heretofore, on the one hand, since a light source has a specific light exiting angle, a location of the light exit surface of a light guide plate that corresponds to a gap between two light sources may become a dark zone, making the light exiting from the light guide plate non-uniform; and on the other hand, after being by the microstructures, a portion of incident light is directed to irradiate side surfaces or the light incidence surface of the light guide plate, causing leakage of light.

SUMMARY OF THE INVENTION

Embodiment of the present invention provide a light guide plate, a backlight module, and a display device, which help improve uniformity of light exiting from the light guide plate and increase utilization of light.

In a first aspect, an embodiment of the preset invention provides a light guide plate, which comprises a light exit surface, a reflection surface opposite to the light exit surface, and at least one light incidence surface connecting to the light exit surface and the reflection surface, wherein the reflection surface comprises a plurality of first minute projection structures and a plurality of second minute projection structures projecting toward interior of the light guide plate, the light guide plate further comprising two side surfaces connecting to the light exit surface, the reflection surface, and the at least one light incidence surface, the second minute projection structures being arranged between the first minute projection structures and the two side faces of the light guide plate, wherein the first minute projection structures each comprise at least two side faces coated with a high reflectivity material and the at least two high reflectivity material coated side faces of the first minute projection structure define at least one included angle pointing toward the at least one light incidence surface; and the second minute projection structures each comprise a side face that is coated with a high reflectivity material and the side face of the second minute projection structure defines two angles, which are less than 90°, with respect to a closest light incidence surface and a closest light guide plate side surface.

Optionally, the second minute projection structures are each arranged between a location corresponding to one of the light sources that is closest to one of the light guide plate side surface and the light guide plate side surface.

Optionally, the light guide plate comprises one light incidence surface; and the first minute projection structures each comprise two high reflectivity material coated side faces in such a way that the two high reflectivity material coated side faces of the first minute projection structure define an included angle pointing toward the light incidence surface.

Optionally, the first minute projection structures each have a shape of one of a triangular pyramid, a triangular prism, and a triangular frustum; and the second minute projection structures each have a shape of one of a triangular pyramid, a triangular prism, and a triangular frustum.

Optionally, the light guide plate comprises two opposite light incidence surfaces;

the first minute projection structures each comprise four high reflectivity material coated side faces and the four high reflectivity material coated side faces define two included angles respectively pointing toward the two opposite light incidence surfaces.

Optionally, the first minute projection structures each have a shape of one of a quadrangular pyramid, a quadrangular prism, and a quadrangular frustum; and the second minute projection structures each have a shape of one of a triangular pyramid, a triangular prism, and a triangular frustum.

Optionally, the minute projection structures have a distance therebetween that is 50 µm-500 µm.

Optionally, the minute projection structures each have a base having an edge length that is 50 µm-100 µm.

In a second aspect, an embodiment of the present invention provides a backlight module, which comprises a light guide plate and a plurality of light sources. The plurality of light sources is distributed along at least one light incidence surface of the light guide plate.

In a third aspect, an embodiment of the present invention provides a display device that comprises a backlight module of the second aspect.

In the embodiments of the present invention, the light guide plate comprises a plurality of first minute projection structures and a plurality of second minute projection structures formed on a reflection surface thereof and each first minute projection structure has at least two side faces coated with a high reflectivity material. The at least two side faces define at least one included angle pointing toward a light incidence surface of the light guide plate so as to reflect incident light to locations that correspond to gaps between light sources to prevent formation of dark zones at locations of the light guide plate corresponding to the gaps between the light sources thereby improving uniformity of exiting light. The second minute projection structures are arranged besides two side surfaces of the light guide plate and each comprise a side face coated with a high reflectivity material to reflect light irradiating the side surfaces of the light guide plate back into the interior of the light guide plate to prevent light leakage thereby increasing light utilization of the light guide plate.

BRIEF DESCRIPTION OF THE DRAWINGS

To more clearly explain the technical solution proposed in an embodiment of the present invention and that of the prior art, brief descriptions of the drawings that are necessary for describing the embodiment or the prior art are given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Embodiments of the present invention provide a light guide plate, a backlight module, and a display device, which help improve uniformity of light exiting from the light guide plate and reduce optic loss. A detailed description will be given to the embodiments of the present invention with reference to the attached drawings.

Figure 1:
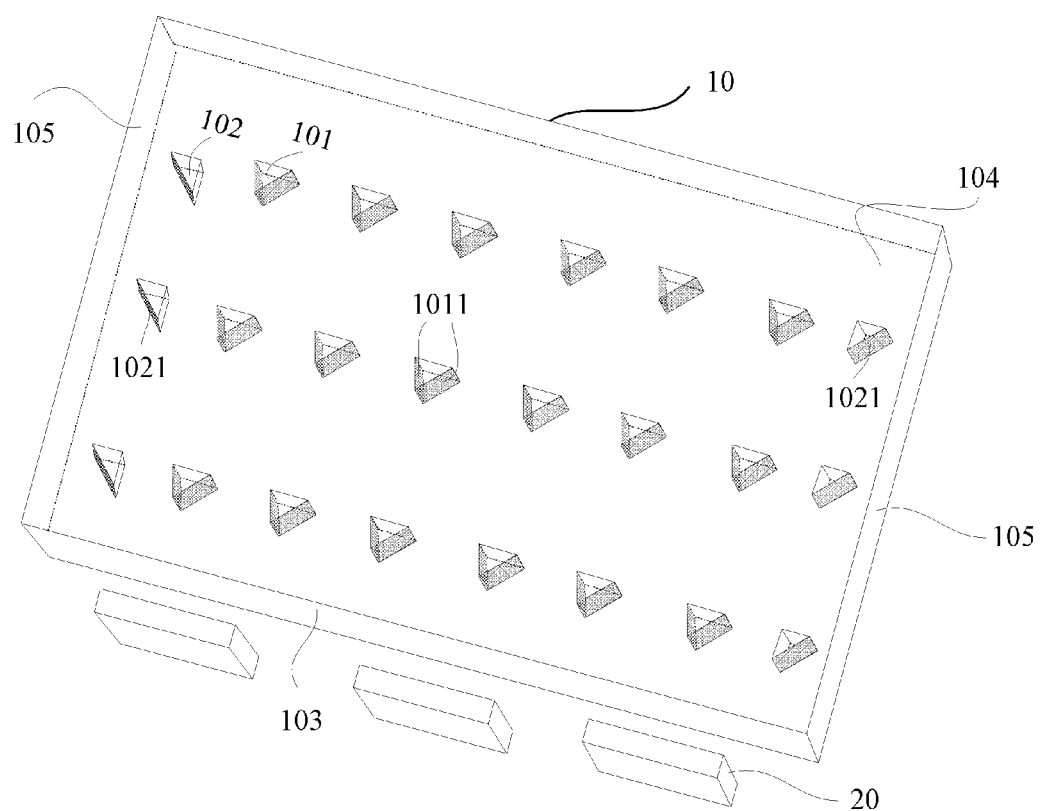
FIG. 1 is a schematic view showing the structure of a light guide plate according to an embodiment of the present invention.

Referring to FIG. 1, a schematic view is given to illustrate an example of a light guide plate according to an embodiment of the present invention. As shown in FIG. 1, the light guide plate 10 comprises a light exit surface, a reflection surface 104 that is opposite to the light exit surface, and at least one light incidence surface 103 connected to the light exit surface and the reflection surface 104. The reflection surface 104 comprises a plurality of first minute projection structures 101 and a plurality of second minute projection structures 102 projecting toward interior of the light guide plate 10. The light guide plate 10 further comprises two side surfaces 105 connecting to the light exit surface, the reflection surface 104, and the at least one light incidence surface 103. The second minute projection structures 102 are arranged between the first minute projection structure 101 and the two side surfaces 105 of the light guide plate, wherein:

the first minute projection structures 101 each comprise at least two side faces 1011 coated with a high reflectivity material and the at least two high reflectivity material coated side faces 1011 of the first minute projection structure 101 define at least one included angle pointing toward the at least one light incidence surface 103; and the second minute projection structures 102 each comprise a side face 1021 that is coated with a high reflectivity material and the side face 1021 of the second minute projection structure 102 defines two angles, which are less than 90°, with respect to the closest light incidence surface 103 and the closest light guide plate side surface 105.

Figure 2:
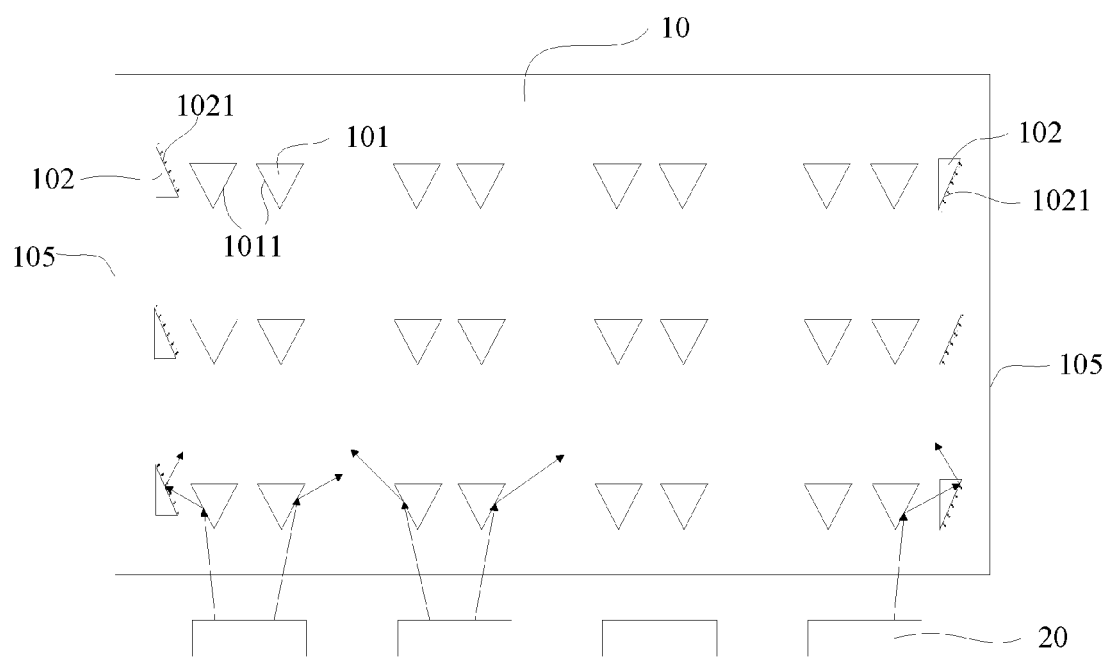
FIG. 2 is a schematic view showing the structure of a light guide plate according to another embodiment of the present invention.

Referring also to FIG. 2, as shown in FIG. 2, light sources 20 emitting light that, after being reflected by the at least two side faces 1011 of each of the first minute projection structures 101, irradiate in a direction toward a location corresponding to a gap between the light sources 20 and away from the light sources 20 so as to enhance the exiting light brightness at the location of the light guide plate corresponding to the gap between the light sources 20 and thus preventing the formation of a dark zone. Further, light that irradiates the light guide plate side surfaces 105 are reflected back into the interior of the light guide plate 10 by the side faces 1021 of the second minute projection structures 102 to prevent the light from projecting outward from the light guide plate side surfaces 105 to cause light leakage thereby increasing light utilization of the light guide plate.

Further, as shown in FIG. 2, the second minute projection structures 102 may each be arranged between a location corresponding to one of the light sources 20 that is closest to one of the light guide plate side surfaces 105 and the light guide plate side surface 105. Specifically, the second minute projection structures 102 can be respectively arranged at locations besides the two side surfaces 105 of the light guide plate 10 and the first minute projection structures 101 may be arranged at locations of a middle portion of the light guide plate 20 that correspond to the light sources 20.

In some feasible embodiments, the light guide plate 10 comprises one light incidence surface 103; and in this condition, the first minute projection structures 101 each comprise two side faces 1011 coated with the high reflectivity material and the two high reflectivity material coated side faces 1011 define and included angle pointing toward the light incidence surface 103.

Optionally, the first minute projection structures 101 may have a shape that is at least one of a triangular pyramid, a triangular prism, and a triangular frustum; and the second minute projection structures 102 may have a shape that is at least one of a triangular pyramid, a triangular prism, and a triangular frustum.

Figure 3:
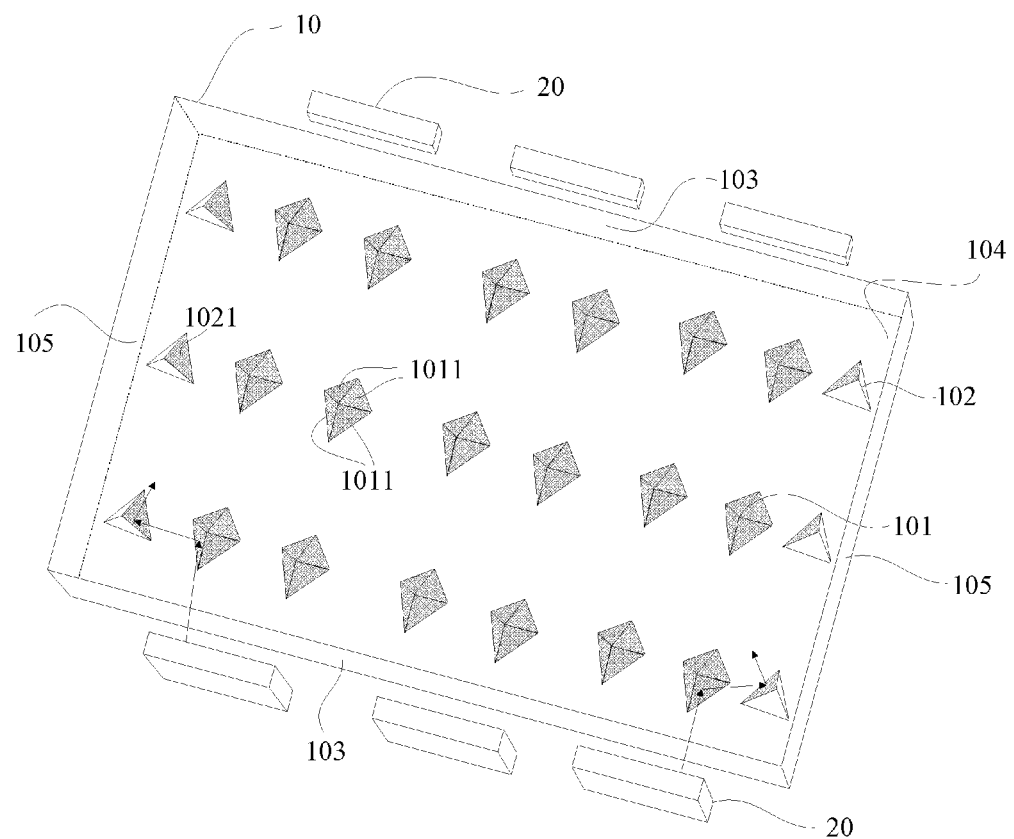
FIG. 3 is a schematic view showing the structure of a light guide plate according to a further embodiment of the present invention.

In another feasible embodiments, as shown in FIG. 3, the light guide plate 10 comprises two opposite light incidence surfaces 103; and in this condition, the first minute projection structures 101 comprises four side faces 1011 that are coated with a high reflectivity material and the four high reflectivity material coated side faces 1011 define two include angles respectively pointing toward the two opposite light incidence surfaces 103.

Optionally, the first minute projection structures 101 may have a shape that is at least one of a quadrangular pyramid, a quadrangular prism, and a quadrangular frustum; and the second minute projection structures 102 may have a shape that is at least one of a triangular pyramid, a triangular prism, and a triangular frustum.

In an embodiment, since the first minute projection structures 101 and the second minute projection structures 102 exhibit an effect of absorbing light to some extents, to prevent light from being further weakened at the location correspond to the gap between the light sources 20, the first minute projection structures 101 may be arranged to correspond to the light sources 20. Specifically, the first minute projection structures 101 that are arranged at locations corresponding to the gaps between the light sources 20 of the light guide plate 10 have a smaller density or no first minute projection structure 101 is arranged at a location corresponding to the gap between the light sources 20 of the light guide plate 10.

Figure 4:
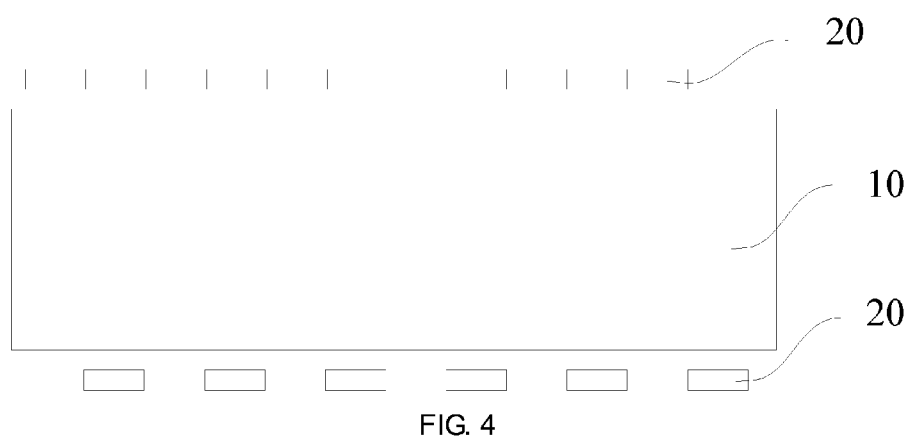
FIG. 4 is a schematic view showing the structure of a light guide plate according to yet a further embodiment of the present invention.

In an embodiment, as shown in FIG. 4, the light sources 20 are respectively set at two opposite light incidence surfaces 102 of the light guide plate 10 in a manner of being alternate with each other.

In an embodiment, a distance between the first minute projection structures 101 is set to be 50 μm-500 μm. An edge length of a base of the first minute projection structure 101 can be set to be 50 μm-100 μm. The base of the first minute projection structure 101 is a side of the first minute projection structure 101 that intersects the reflection surface 104 of the light guide plate 10.

The light guide plate according to embodiments of the present invention comprises a plurality of first minute projection structures and a plurality of second minute projection structures formed on the reflection surface and each of the first minute projection structures has at least two side faces coated with a high reflectivity material with the at least two side faces defining at least one included angle pointing toward the light incidence surface of the light guide plate to thereby reflect incident light to a location corresponding to a gap between light sources to prevent formations of dark zones at the locations corresponding to the gaps of the light sources to thereby enhance uniformity of exiting light; the second minute projection structures are arranged besides two side surfaces of the light guide plate and each comprise a side face coated with a high reflectivity material to reflect light irradiating the light guide plate side surface back into the interior of the light guide plate to prevent light leakage thereby increasing light utilization of the light guide plate.

Correspondingly, an embodiment of the present invention further provides a backlight module and the backlight module comprises a light guide plate of one of the embodiments shown in FIGS. 1-4.

Correspondingly, an embodiment of the present invention further provides a display device and the display device comprises the above-described backlight module.

The backlight module and display device provided by the present invention may reflect light to locations that correspond to gaps between light sources in a direction away from the light sources thereby enhancing uniformity of exiting light and may reflect light irradiating side surfaces of the light guide plate back into the interior of the light guide plate to prevent light leakage thereby increasing light utilization of the light guide plate.

The embodiments illustrated above are not construed as limiting the scope of protection of the technical solutions. Modifications, equivalent substitutions, and improvements that are made without departing from the spirits and principles of the above-described embodiments are considered within the scope of protection of the technical solutions.

What is claimed is:

1. A light guide plate, comprising a light exit surface, a reflection surface opposite to the light exit surface, and at least one light incidence surface connecting to the light exit surface and the reflection surface, wherein
the reflection surface comprises a plurality of first minute projection structures and a plurality of second minute projection structures projecting toward interior of the light guide plate, the light guide plate further comprising two side surfaces connecting to the light exit surface, the reflection surface, and the at least one light incidence surface, the second minute projection structures being arranged between the first minute projection structures and the two side faces of the light guide plate, wherein
the first minute projection structures each comprise at least two side faces coated with a high reflectivity material and the at least two high reflectivity material coated side faces of the first minute projection structure define at least one included angle pointing toward the at least one light incidence surface; and
the second minute projection structures each comprise a side face that is coated with a high reflectivity material and the side face of the second minute projection structure defines two angles, which are less than 90°, with respect to a closest light incidence surface and a closest light guide plate side surface.

2. The light guide plate as claimed in claim 1, wherein the second minute projection structures are each arranged between a location corresponding to one of the light sources that is closest to one of the light guide plate side surface and the light guide plate side surface.

3. The light guide plate as claimed in claim 1, wherein the light guide plate comprises one light incidence surface; and
the first minute projection structures each comprise two high reflectivity material coated side faces in such a way that the two high reflectivity material coated side faces of the first minute projection structure define an included angle pointing toward the light incidence surface.

4. The light guide plate as claimed in claim 3, wherein the first minute projection structures each have a shape of one of a triangular pyramid, a triangular prism, and a triangular frustum; and
the second minute projection structures each have a shape of one of a triangular pyramid, a triangular prism, and a triangular frustum.

5. The light guide plate as claimed in claim 1, wherein the light guide plate comprises two opposite light incidence surfaces;
the first minute projection structures each comprise four high reflectivity material coated side faces and the four high reflectivity material coated side faces define two included angles respectively pointing toward the two opposite light incidence surfaces.

6. The light guide plate as claimed in claim 5, wherein the first minute projection structures each have a shape of one of a quadrangular pyramid, a quadrangular prism, and a quadrangular frustum; and
the second minute projection structures each have a shape of one of a triangular pyramid, a triangular prism, and a triangular frustum.

7. The light guide plate as claimed in claim 1, wherein the minute projection structures have a distance therebetween that is 50 μm-500 μm.

8. The light guide plate as claimed in claim 1, wherein the minute projection structures each have a base having an edge length that is 50 μm-100 μm.

9. A backlight module, comprising a light guide plate and a plurality of light sources distributed along at least one light incidence surface of the light guide plate, the light guide plate comprising a light exit surface, a reflection surface opposite to the light exit surface, and at least one light incidence surface connecting to the light exit surface and the reflection surface, wherein
the reflection surface comprises a plurality of first minute projection structures and a plurality of second minute projection structures projecting toward interior of the light guide plate, the light guide plate further comprising two side surfaces connecting to the light exit surface, the reflection surface, and the at least one light incidence surface, the second minute projection structures being arranged between the first minute projection structures and the two side faces of the light guide plate, wherein the first minute projection structures each comprise at least two side faces coated with a high reflectivity material and the at least two high reflectivity material coated side faces of the first minute projection structure define at least one included angle pointing toward the at least one light incidence surface; and the second minute projection structures each comprise a side face that is coated with a high reflectivity material and the side face of the second minute projection structure defines two angles, which are less than 90°, with respect to a closest light incidence surface and a closest light guide plate side surface.

10. The backlight module as claimed in claim 9, wherein the second minute projection structures are each arranged between a location corresponding to one of the light sources that is closest to one of the light guide plate side surface and the light guide plate side surface.

11. The backlight module as claimed in claim 10, wherein the light guide plate comprises one light incidence surface; and the first minute projection structures each comprise two high reflectivity material coated side faces in such a way that the two high reflectivity material coated side faces of the first minute projection structure define an included angle pointing toward the light incidence surface.

12. The backlight module as claimed in claim 11, wherein the first minute projection structures each have a shape of one of a triangular pyramid, a triangular prism, and a triangular frustum; and the second minute projection structures each have a shape of one of a triangular pyramid, a triangular prism, and a triangular frustum.

13. The backlight module as claimed in claim 10, wherein the light guide plate comprises two opposite light incidence surfaces;

the first minute projection structures each comprise four high reflectivity material coated side faces and the four high reflectivity material coated side faces define two included angles respectively pointing toward the two opposite light incidence surfaces.

14. The backlight module as claimed in claim 13, wherein the first minute projection structures each have a shape of one of a quadrangular pyramid, a quadrangular prism, and a quadrangular frustum; and the second minute projection structures each have a shape of one of a triangular pyramid, a triangular prism, and a triangular frustum.

15. A display device, comprising at least one backlight module, the backlight module comprising a light guide plate and a plurality of light sources distributed along at least one light incidence surface of the light guide plate, the light guide plate comprising a light exit surface, a reflection surface opposite to the light exit surface, and at least one light incidence surface connecting to the light exit surface and the reflection surface, wherein the reflection surface comprises a plurality of first minute projection structures and a plurality of second minute projection structures projecting toward interior of the light guide plate, the light guide plate further comprising two side surfaces connecting to the light exit surface, the reflection surface, and the at least one light incidence surface, the second minute projection structures being arranged between the first minute projection structures and the two side faces of the light guide plate, wherein the first minute projection structures each comprise at least two side faces coated with a high reflectivity material and the at least two high reflectivity material coated side faces of the first minute projection structure define at least one included angle pointing toward the at least one light incidence surface; and the second minute projection structures each comprise a side face that is coated with a high reflectivity material and the side face of the second minute projection structure defines two angles, which are less than 90°, with respect to a closest light incidence surface and a closest light guide plate side surface.

16. The display device as claimed in claim 15, wherein the second minute projection structures are each arranged between a location corresponding to one of the light sources that is closest to one of the light guide plate side surface and the light guide plate side surface.

17. The display device as claimed in claim 16, wherein the light guide plate comprises one light incidence surface; and the first minute projection structures each comprise two high reflectivity material coated side faces in such a way that the two high reflectivity material coated side faces of the first minute projection structure define an included angle pointing toward the light incidence surface.

18. The display device as claimed in claim 17, wherein the first minute projection structures each have a shape of one of a triangular pyramid, a triangular prism, and a triangular frustum; and the second minute projection structures each have a shape of one of a triangular pyramid, a triangular prism, and a triangular frustum.

19. The display device as claimed in claim 16, wherein the light guide plate comprises two opposite light incidence surfaces;

the first minute projection structures each comprise four high reflectivity material coated side faces and the four high reflectivity material coated side faces define two included angles respectively pointing toward the two opposite light incidence surfaces.

20. The display device as claimed in claim 19, wherein the first minute projection structures each have a shape of one of a quadrangular pyramid, a quadrangular prism, and a quadrangular frustum; and the second minute projection structures each have a shape of one of a triangular pyramid, a triangular prism, and a triangular frustum.

* * * * *